(12) United States Patent
Pan et al.

(10) Patent No.: US 11,733,590 B1
(45) Date of Patent: Aug. 22, 2023

(54) IMAGE CAPTURING DEVICE

(71) Applicant: PRIMAX ELECTRONICS LTD., Taipei (TW)

(72) Inventors: Yung-Tai Pan, Taipei (TW); Yi-Ping Hsieh, Taipei (TW); Chun-Chieh Yeh, Taipei (TW); Yu-Cheng Ma, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/659,335

(22) Filed: Apr. 15, 2022

(30) Foreign Application Priority Data

Feb. 25, 2022 (TW) .................................. 111107052

(51) Int. Cl.
*G03B 17/12* (2021.01)
(52) U.S. Cl.
CPC .................................... *G03B 17/12* (2013.01)
(58) Field of Classification Search
CPC ....................................................... G03B 17/12
See application file for complete search history.

(56) References Cited

U.S. PATENT DOCUMENTS

| | | | | |
|---|---|---|---|---|
| 10,602,040 | B2 * | 3/2020 | Freeman | G03B 31/00 |
| 10,948,805 | B2 * | 3/2021 | Ma | G03B 17/12 |
| 2008/0031614 | A1 * | 2/2008 | Huang | G02B 7/023 |
| | | | | 396/428 |
| 2019/0068851 | A1 * | 2/2019 | Chang | G03B 17/12 |
| 2019/0320101 | A1 * | 10/2019 | Lincoln | H04N 23/51 |
| 2020/0096844 | A1 * | 3/2020 | Liao | G03B 15/006 |
| 2020/0310227 | A1 * | 10/2020 | Hubert | G02B 7/025 |
| 2022/0137491 | A1 * | 5/2022 | Stankie | F16M 11/041 |
| | | | | 396/428 |

FOREIGN PATENT DOCUMENTS

JP 2004356975 A * 12/2004

* cited by examiner

*Primary Examiner* — Clayton E. LaBalle
*Assistant Examiner* — Diana Hancock
(74) *Attorney, Agent, or Firm* — WPAT, P.C

(57) ABSTRACT

An image capturing device includes a casing, a camera assembly, an adjustment element, a first stopping structure and a second stopping structure. The camera assembly is disposed within the casing. A portion of the camera assembly is exposed outside the casing. The adjustment element is connected with the camera assembly, and rotatable relative to the casing. As the adjustment element is rotated, the camera assembly is correspondingly rotated. The adjustment element includes a contacting structure. The first stopping structure and the second stopping structure are arranged between the casing and the adjustment element and located at different positions. When the camera assembly is switched to a horizontal photographing mode, the contacting structure is positioned at the first stopping structure. When the camera assembly is switched to a vertical photographing mode, the contacting structure is positioned at the second stopping structure.

9 Claims, 8 Drawing Sheets

IMAGE CAPTURING DEVICE

FIELD OF THE INVENTION

The present invention relates to an image optics field, and more particularly to an image capturing device.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various image capturing devices are widely used in many kinds of fields such as smart phones, wearable electronic devices or any other appropriate portable electronic devices. Since the electronic devices are small and portable, the users can take the electronic devices to capture images and store the images according to the practical requirements. Alternatively, the images can be uploaded to the internet through mobile networks. In other words, these electronic devices not only have important commercial values but also provide more colorful lives to people.

However, the uses of the image capturing devices to photograph photos or videos still have some drawbacks. For example, in case that the photographing mode of the image capturing device is switched from a vertical photographing mode to a horizontal photographing mode or switched from the horizontal photographing mode to the vertical photographing mode, the user has to disassemble the installed equipment, rotate the equipment, and then re-install the equipment. In other words, the method of switching the photographing mode of the image capturing device between the vertical photographing mode and the horizontal photographing mode is not user-friendly.

Therefore, there is a need of providing an improved image capturing device in order to overcome the drawbacks of the conventional technologies.

SUMMARY OF THE INVENTION

The present invention provides an image capturing device. By rotating a camera assembly, the camera assembly is switchable between a horizontal photographing mode and a vertical photographing mode.

The other objects and advantages of the present invention will be understood from the disclosed technical features.

In accordance with an aspect of the present invention, an image capturing device is provided. The image capturing device includes a casing, a camera assembly, an adjustment element, a first stopping structure and a second stopping structure. The camera assembly is disposed within the casing. A portion of the camera assembly is exposed outside the casing. The adjustment element is connected with the camera assembly, and rotatable relative to the casing. As the adjustment element is rotated, the camera assembly is correspondingly rotated. Consequently, the camera assembly is switchable between a horizontal photographing mode and a vertical photographing mode. The adjustment element includes a contacting structure. The first stopping structure is arranged between the casing and the adjustment element. The second stopping structure is arranged between the casing and the adjustment element. The first stopping structure and the second stopping structure are located at different positions. When the camera assembly is rotated with the adjustment element and the camera assembly is switched from the vertical photographing mode to the horizontal photographing mode, the contacting structure is positioned at the first stopping structure. When the camera assembly is rotated with the adjustment element and the camera assembly is switched from the horizontal photographing mode to the vertical photographing mode, the contacting structure is positioned at the second stopping structure.

In an embodiment, the camera assembly includes a shell member and a lens module, and the lens module is installed within the shell member. The shell member has a front surface and a first hollow portion. The first hollow portion is formed in the front surface of the shell member. The lens module includes a lens unit, a pedestal and a circuit board. The pedestal is arranged between the lens unit and the circuit board. The circuit board is fixed on the shell member. The lens unit is penetrated through the first hollow portion and exposed outside the shell member.

In an embodiment, the casing includes a front cover and a rear cover, and the front cover has a second hollow portion. The camera assembly is arranged between the front cover and the rear cover. The lens unit of the lens module and the front surface of the shell member are exposed outside the second hollow portion.

In an embodiment, the first stopping structure and the second stopping structure are arranged on different positions of an outer periphery of the second hollow portion.

In an embodiment, the adjustment element is connected with the front surface of the shell member, so that the front cover is clamped between the adjustment element and the shell member.

In an embodiment, the adjustment element includes a base plate and a sheathing wall, and the base plate has a third hollow portion. The sheathing wall is protruded from an edge region of the base plate in a direction toward the front cover. The sheathing wall has an inner surface and an outer surface opposite to the inner surface. The contacting structure of the adjustment element is formed on the inner surface of the sheathing wall. The lens unit of the lens module is exposed outside the third hollow portion.

In an embodiment, the adjustment element further includes an anti-slip structure, and the anti-slip structure is formed on the outer surface of the sheathing wall.

In an embodiment, the adjustment element further includes a marking structure, and the marking structure is located at the base plate of the adjustment element and located near the contacting structure. When the camera assembly is rotated with the adjustment element and the camera assembly is switched from the vertical photographing mode to the horizontal photographing mode, the contacting structure is positioned at the first stopping structure, and the marking structure is aligned with the first stopping structure. When the camera assembly is rotated with the adjustment element and the camera assembly is switched from the horizontal photographing mode to the vertical photographing mode, the contacting structure is positioned at the second stopping structure, and the marking structure is aligned with the second stopping structure.

In an embodiment, each of the first stopping structure and the second stopping structure includes a protrusion stopper and a resilience stopping bulge. When the contacting structure is positioned at the first stopping structure or the second stopping structure, the contacting structure of the adjustment element is arranged between the protrusion stopper and the resilience stopping bulge.

In an embodiment, the first stopping structure is integrally formed with the casing, and the second stopping structure is integrally formed with the casing.

From the above descriptions, the present invention provides the image capturing device. As the adjustment element is rotated, the camera assembly is correspondingly rotated. Consequently, the camera assembly can be switched between the horizontal photographing mode and the vertical photographing mode. When the camera assembly is rotated with the adjustment element and the camera assembly 11 is switched to the horizontal photographing mode or the vertical photographing mode, the contacting structure of the adjustment element is positioned at the first stopping structure or the second stopping structure. In other words, regardless of whether the camera assembly is in the horizontal photographing mode or the vertical photographing mode, the camera assembly is not rocked. Consequently, the photographing quality of the camera assembly is not adversely affected.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
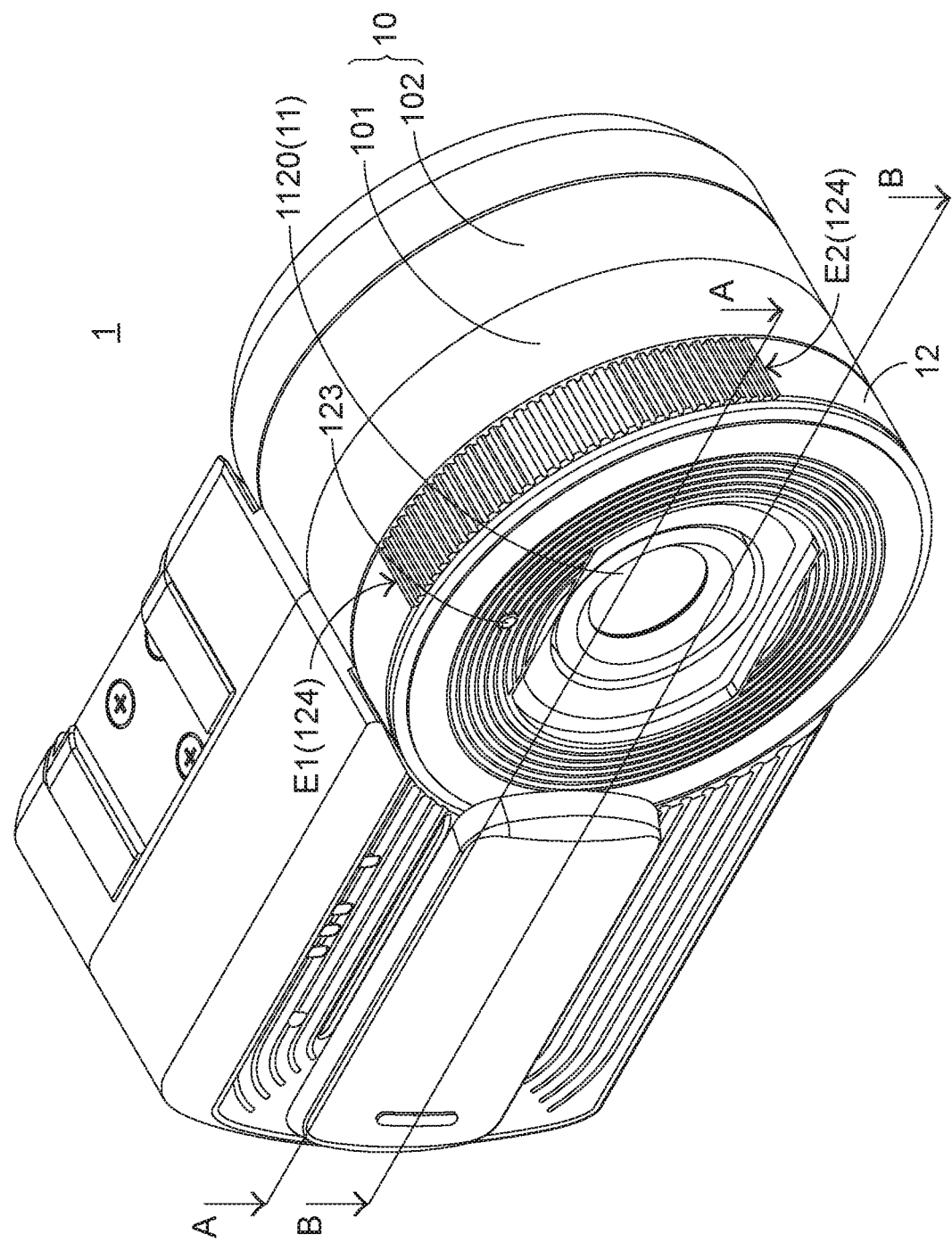
FIG. 1 is a schematic perspective view illustrating the appearance of an image capturing device according to an embodiment of the present invention.
Figure 2:
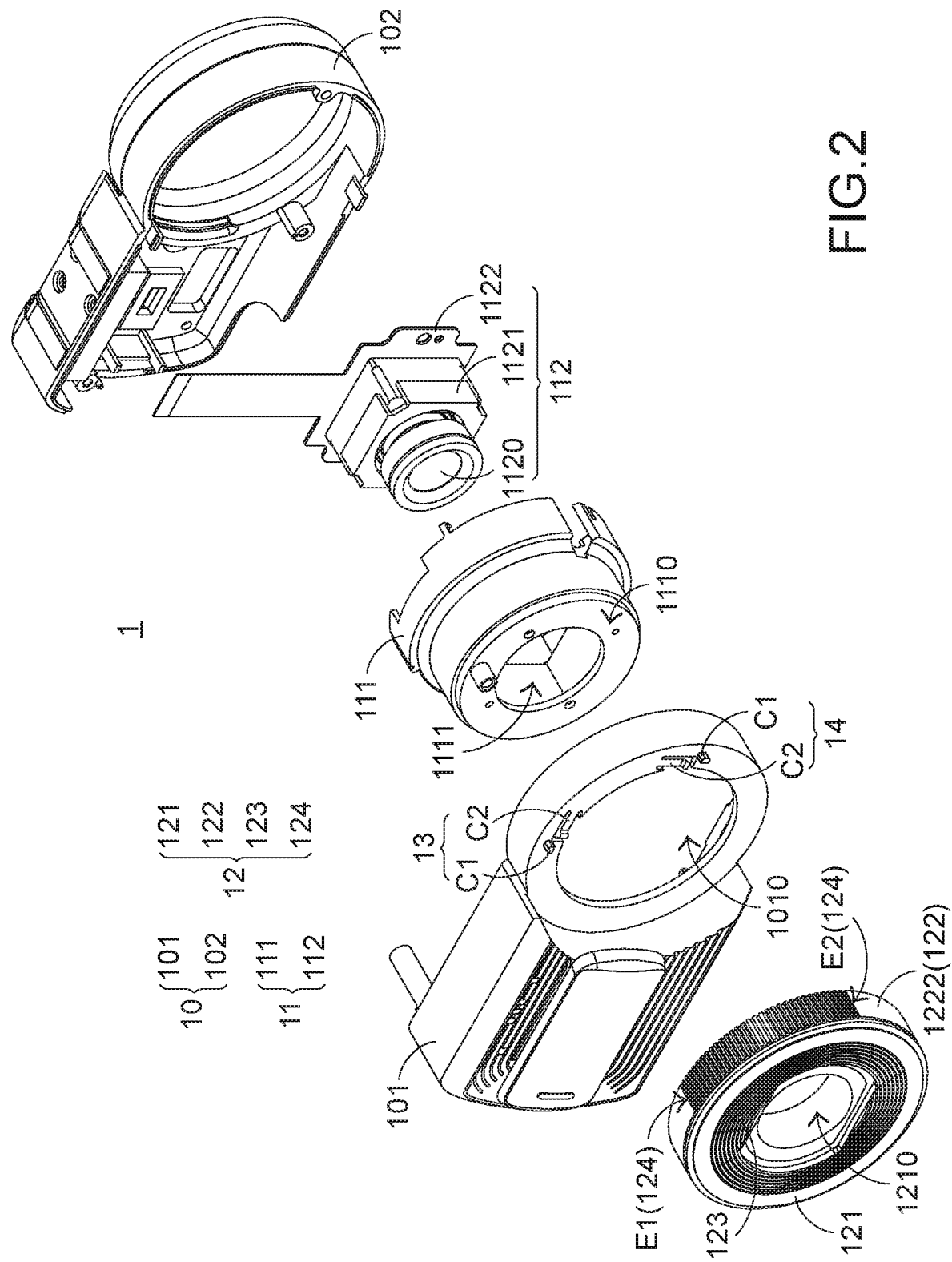
FIG. 2 is a schematic exploded view illustrating the image capturing device as shown in FIG. 1.
Figure 3:
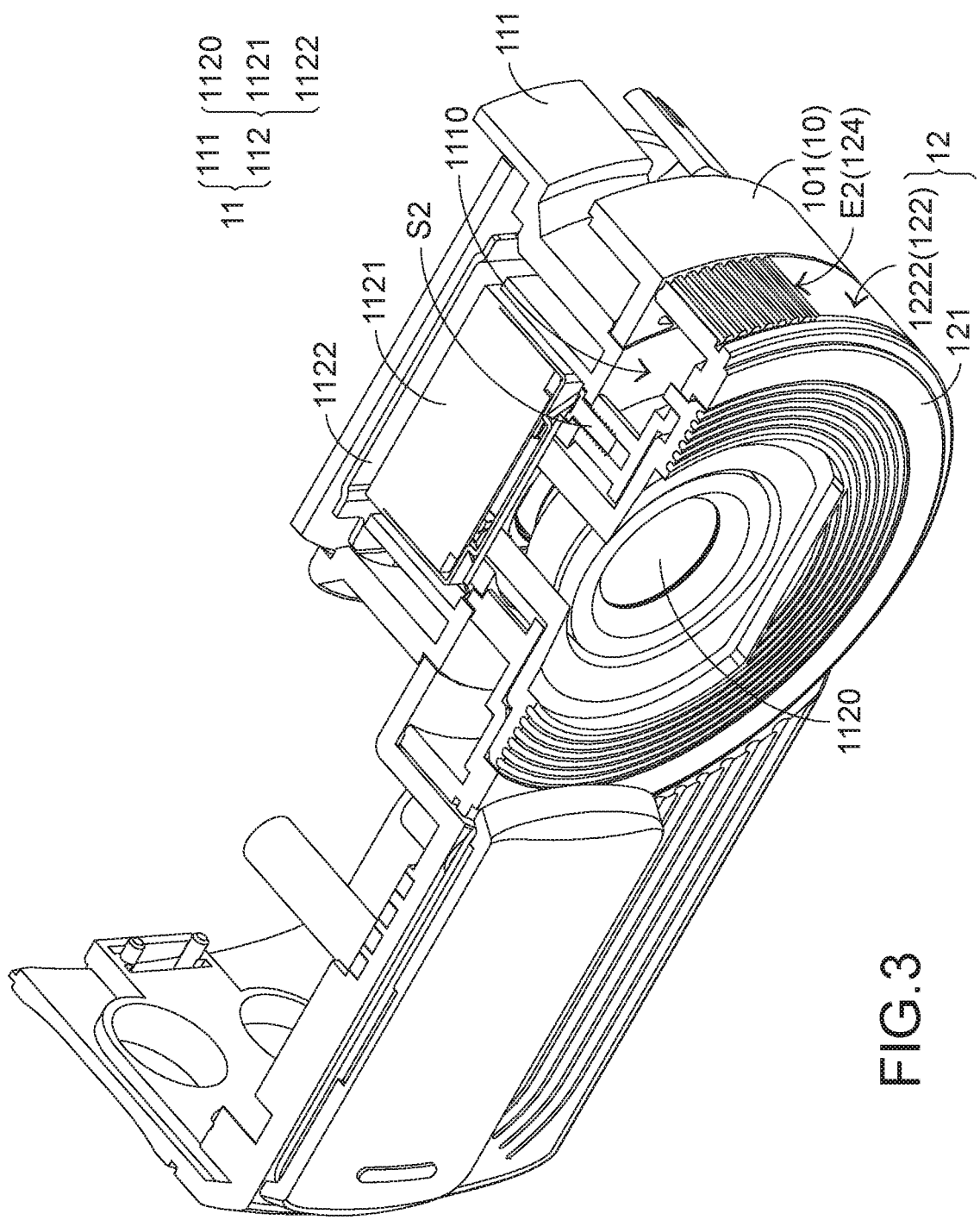
FIG. 3 is a schematic cutaway view illustrating the image capturing device as shown in FIG. 1 and taken along the line AA.
Figure 4:
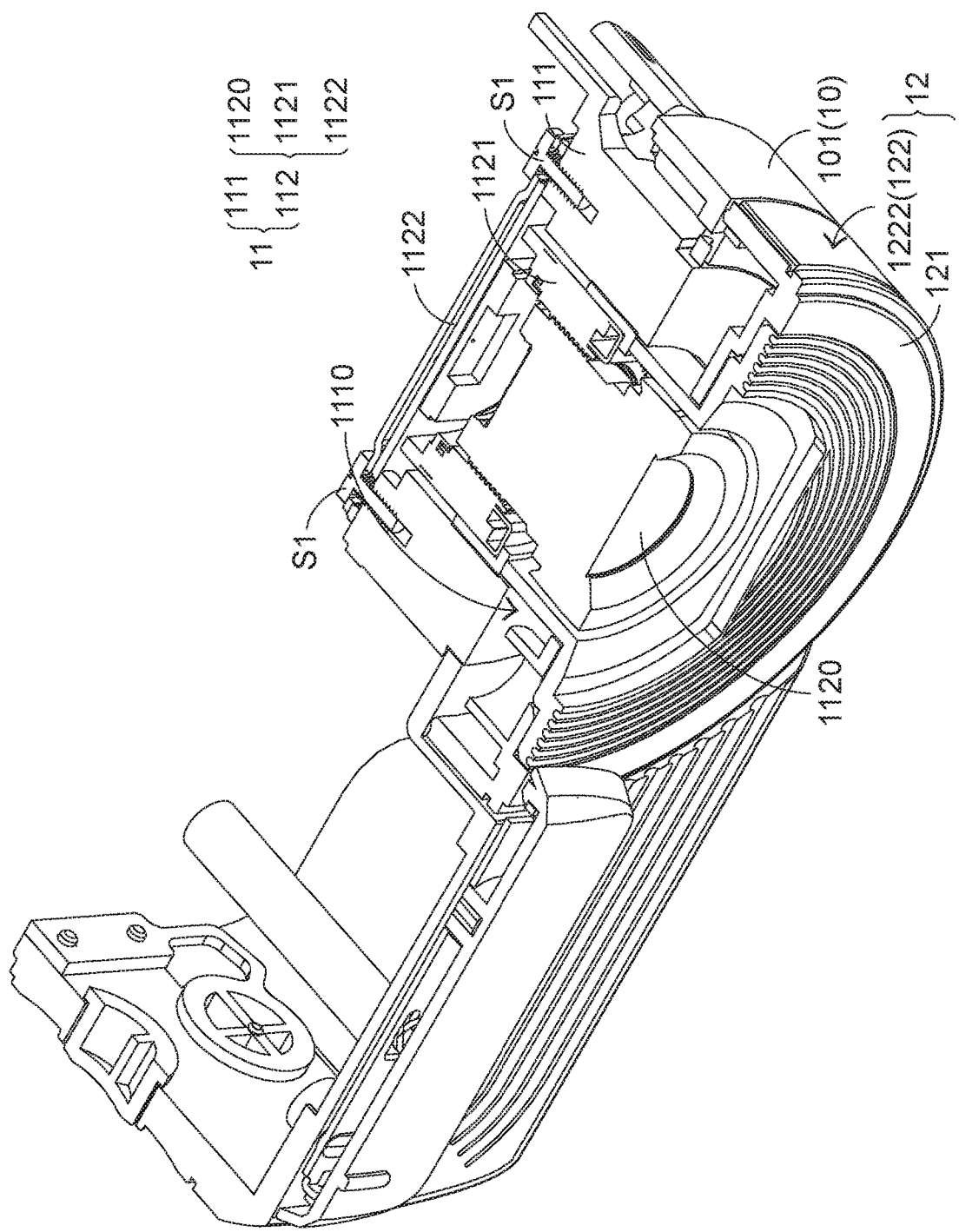
FIG. 4 is a schematic cutaway view illustrating the image capturing device as shown in FIG. 1 and taken along the line BB.
Figure 5:
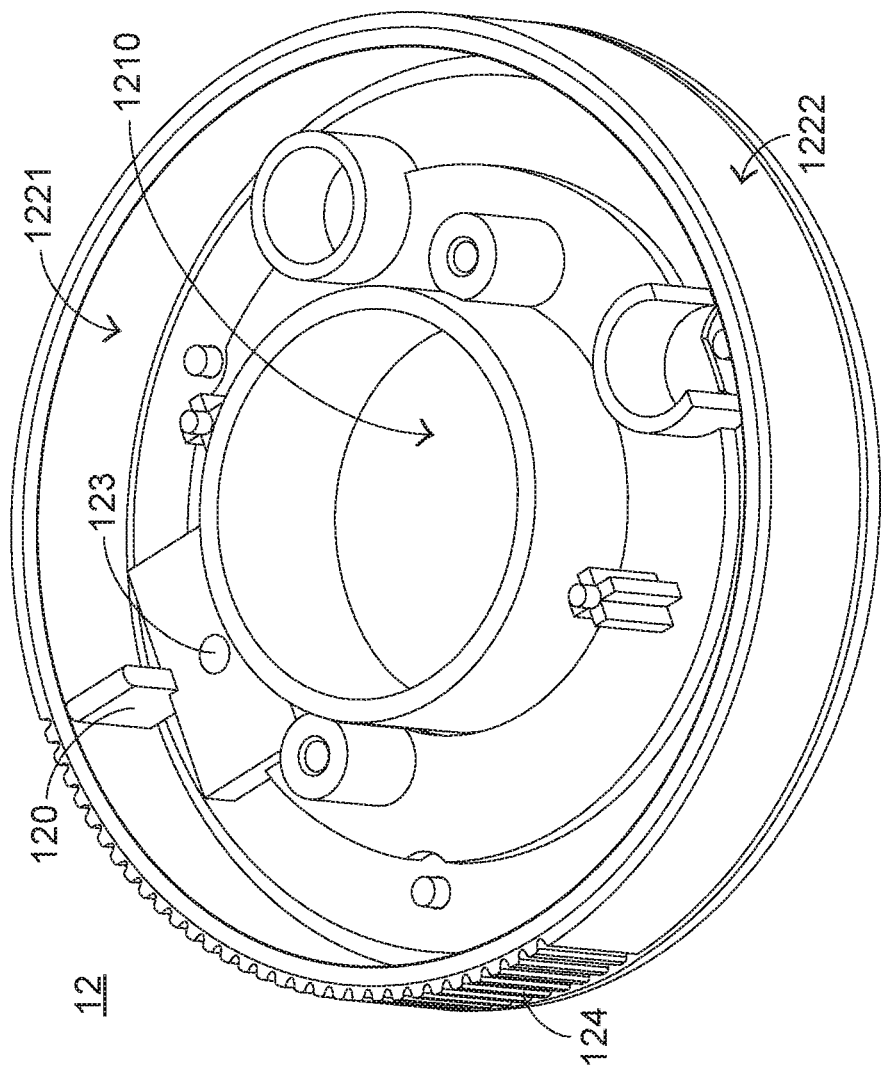
FIG. 5 is a schematic perspective view illustrating an adjustment element of the image capturing device as shown in FIG. 2.
Figure 6:
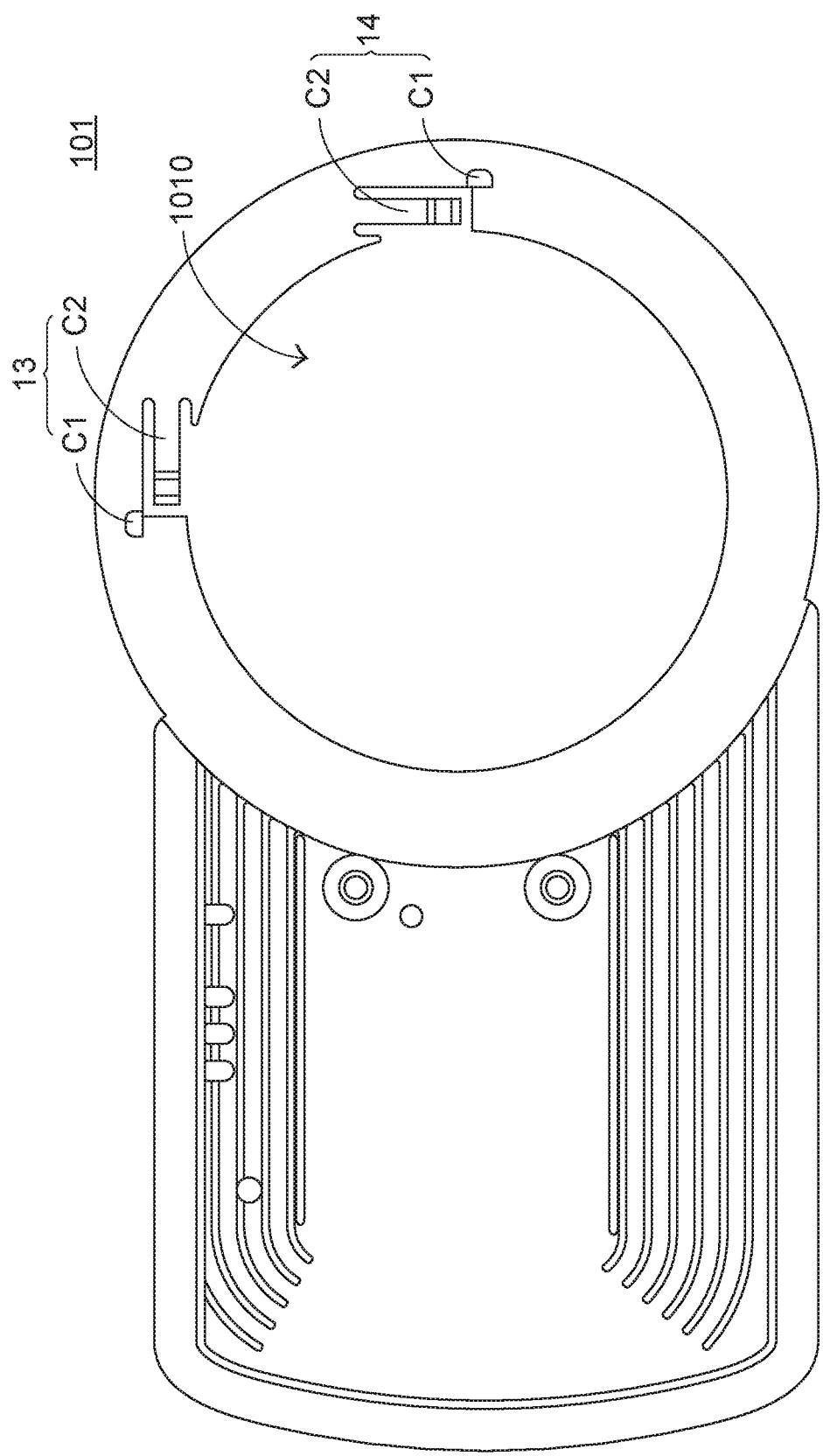
FIG. 6 is a schematic top view illustrating a front cover of a casing of the image capturing device as shown in FIG. 2.
Figure 7:
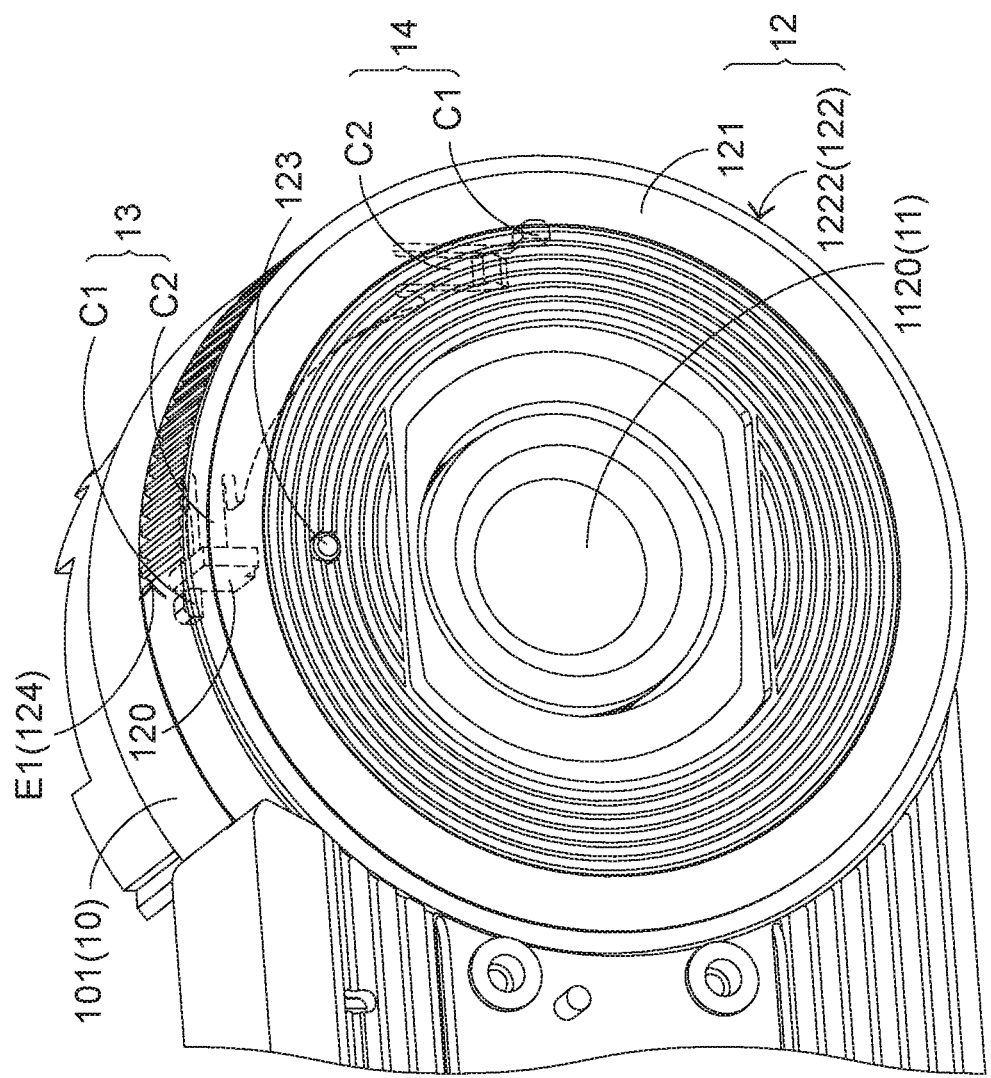
FIG. 7 schematically illustrates the operation of the image capturing device in a horizontal photographing mode.
Figure 8:
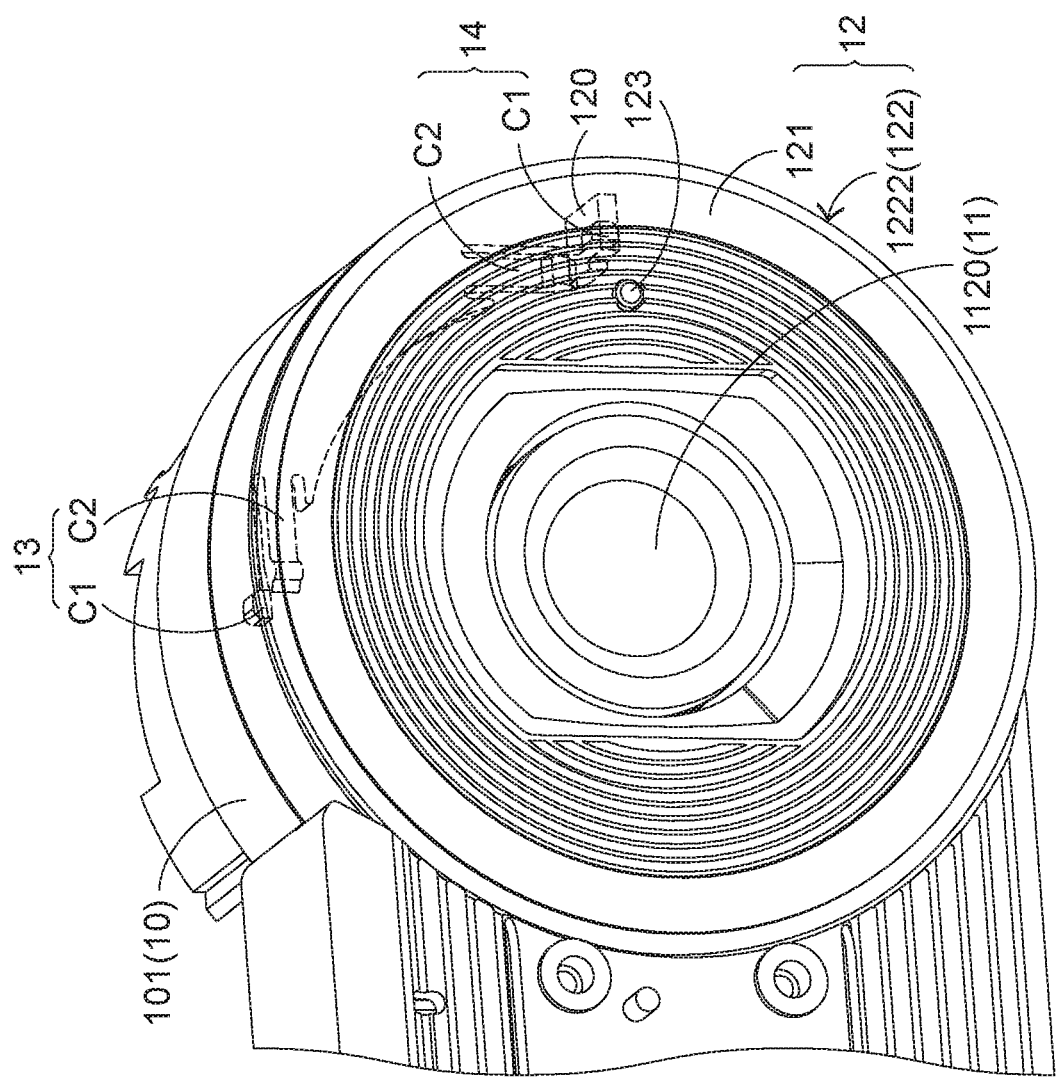
FIG. 8 schematically illustrates the operation of the image capturing device in a vertical photographing mode.

Please refer to FIGS. 1 to 8. FIG. 1 is a schematic perspective view illustrating the appearance of an image capturing device according to an embodiment of the present invention. FIG. 2 is a schematic exploded view illustrating the image capturing device as shown in FIG. 1. FIG. 3 is a schematic cutaway view illustrating the image capturing device as shown in FIG. 1 and taken along the line AA. FIG. 4 is a schematic cutaway view illustrating the image capturing device as shown in FIG. 1 and taken along the line BB. FIG. 5 is a schematic perspective view illustrating an adjustment element of the image capturing device as shown in FIG. 2. FIG. 6 is a schematic top view illustrating a front cover of the casing of the image capturing device as shown in FIG. 2. FIG. 7 schematically illustrates the operation of the image capturing device in a horizontal photographing mode. FIG. 8 schematically illustrates the operation of the image capturing device in a vertical photographing mode.

For clearly illustrating the connecting relationships between the components of the image capturing device, the rear cover of FIG. 2 is not shown in the cutaway views of FIGS. 3 and 4.

Please refer to FIGS. 1, 2, 3, 4, 5 and 6. The image capturing device 1 comprises a casing 10, a camera assembly 11, an adjustment element 12, a first stopping structure 13 and a second stopping structure 14. The camera assembly 11 is disposed within the casing 10. A portion of the camera assembly 11 is exposed outside the casing 10. The adjustment element 12 is connected with the camera assembly 11. The adjustment element 12 is rotatable relative to the casing 10. As the adjustment element 12 is rotated, the camera assembly 11 is correspondingly rotated. Consequently, the camera assembly 11 is permitted to be switched between a horizontal photographing mode and a vertical photographing mode. Moreover, the adjustment element 12 comprises a contacting structure 120. The first stopping structure 13 is arranged between the casing 10 and the adjustment element 12. The second stopping structure 14 is arranged between the casing 10 and the adjustment element 12. The installation positions of the first stopping structure 13 and the second stopping structure 14 are different.

The first stopping structure 13 and the second stopping structure 14 cooperate with the contacting structure 120 of the adjustment element 12. Consequently, when the adjustment element 12 is rotated to a target position, the first stopping structure 13 and the second stopping structure 14 provide the stopping and positioning function. The interactions and connection relationships between the contacting structure 120, the first stopping structure 13 and the second stopping structure 14 will be described later.

The structure of the image capturing device 1 will be described in more details as follows.

Please refer to FIGS. 1, 2, 3 and 4. In an embodiment, the camera assembly 11 comprises a shell member 111 and a lens module 112. The lens module 112 is installed within the shell member 111. The shell member 111 has a front surface 1110 and a first hollow portion 1111. The first hollow portion 1111 is formed in the front surface 1110 of the shell member 111. The lens module 112 comprises a lens unit 1120, a pedestal 1121 and a circuit board 1122. The pedestal 1121 of the lens module 112 is arranged between the lens unit 1120 and the circuit board 1122. The lens module 112 is fixed within the shell member 111 through the circuit board 1122. After the lens module 112 is fixed within the shell member 111, the lens unit 1120 is penetrated through the first hollow portion 1111 in the front surface 1110 of the shell member 111 and exposed outside the shell member 111. In an embodiment, the circuit board 1122 of the lens module 112 is fixed in the shell member 111 through fastening elements S1. It is noted that the way of fixing circuit board 1122 in the shell member 111 is not restricted.

Please refer to FIGS. 1, 2, 3 and 4 again. In an embodiment, the casing 10 comprises a front cover 101 and a rear cover 102. The front cover 101 has a second hollow portion 1010. The camera assembly 11 is arranged between the front cover 101 and the rear cover 102. After the front cover 101 and the rear cover 102 are combined together, an accommodation space is formed. Consequently, the camera assembly 11 is disposed within the accommodation space. After the camera assembly 11 is installed within the casing 10, the lens unit 1120 of the lens module 112 and the front surface 1110 of the shell member 111 are both exposed outside the second hollow portion 1010 of the front cover 101.

Please refer to FIGS. 1, 2, 3 and 4 again. In an embodiment, the adjustment element 12 is connected with the front surface 1110 of the shell member 111 of the camera assembly 11. After the adjustment element 12 is connected with the front surface 1110 of the shell member 111, the front cover 101 of the casing 10 is clamped between the adjustment element 12 and the shell member 111. Since the adjustment element 12 and the front cover 101 are not fixed on each other, the adjustment element 12 is rotatable relative to the front cover 101. Moreover, as the adjustment element 12 is rotated, the camera assembly 11 is correspondingly rotated. In an embodiment, the adjustment element 12 is fixed on the front surface 1110 of the shell member 111 through fastening elements S2. It is noted that the way of fixing the adjustment element 12 on the shell member 111 is not restricted.

Please refer to FIGS. 1, 2, 3, 4 and 5. In an embodiment, the adjustment element 12 comprises a base plate 121 and a sheathing wall 122. The base plate 121 of the adjustment element 12 has a third hollow portion 1210. The sheathing wall 122 is protruded from an edge region of the base plate 121 in the direction toward the front cover 101. The sheathing wall 122 has an inner surface 1221 and an outer surface 1222, which are opposed to each other. The contacting structure 120 of the adjustment element 12 is formed on the inner surface 1221 of the sheathing wall 122. After the adjustment element 12 and the shell member 111 of the camera assembly 11 are combined together, the lens unit 1120 of the lens module 112 is exposed outside the third hollow portion 1210 of the base plate 121 of the adjustment element 12. In an embodiment, the contacting structure 120 of the adjustment element 12 is a slice structure that is protruded from the inner surface 1221 of the sheathing wall 122. It is noted that the profile of the contacting structure 120 is not restricted.

Please refer to FIGS. 1, 2 and 5 again. In an embodiment, the adjustment element 12 further comprises a marking structure 123. The marking structure 123 is located at the base plate 121 of the adjustment element 12. Moreover, the marking structure 123 is located near the contacting structure 120 on the inner surface 1221 of the sheathing wall 122. That is, the marking structure 123 is located at the edge region of the base plate 121 and aligned with the contacting structure 120. As the adjustment element 12 is rotated, the marking structure 123 is correspondingly rotated with the adjustment element 12. When the adjustment element 12 is rotated to the target position and the contacting structure 120 is contacted with (or positioned at) the first stopping structure 13 or the second stopping structure 14, the marking structure 123 is rotated and moved to the position corresponding to the first stopping structure 13 or the position corresponding to the second stopping structure 14. According to the position of the marking structure 123, the user can clearly realize that the contacting structure 120 is positioned at the first stopping structure 13 or the second stopping structure 14. In an embodiment, the marking structure 123 comprises an opening and a recognizable element (or a light-emitting element). The recognizable element (or the light-emitting element) is disposed within the opening. It is noted that the example of the marking structure 123 is not restricted.

Please refer to FIGS. 1, 2, 3, 4 and 5 again. In an embodiment, the adjustment element 12 further comprises an anti-slip structure 124. The anti-slip structure 124 is formed on the outer surface 1222 of the sheathing wall 122. The user's finger can be placed on the anti-slip structure 124 to rotate the adjustment element 12. In an embodiment, the anti-slip structure 124 has a first end E1 and a second end E2. The first end E1 of the anti-slip structure 124 is aligned with the contacting structure 120, which is formed on the inner surface 1221 of the sheathing wall 122. As the adjustment element 12 is rotated, the anti-slip structure 124 is correspondingly rotated with the adjustment element 12. When the adjustment element 12 is rotated to the target position and the contacting structure 120 is positioned at the first stopping structure 13 or the second stopping structure 14, the first end E1 of the anti-slip structure 124 is rotated and moved to the position corresponding to the first stopping structure 13 or the position corresponding to the second stopping structure 14. Consequently, in addition to the marking structure 123, the user can clearly realize that the contacting structure 120 is positioned at the first stopping structure 13 or the second stopping structure 14 according to the position of the first end E1 of the anti-slip structure 124.

Please refer to FIG. 2 and FIG. 6. In an embodiment, each of the first stopping structure 13 and the second stopping structure 14 comprises a protrusion stopper C1 and a resilience stopping bulge C2. When the adjustment element 12 is rotated to the target position and the contacting structure 120 is positioned at the first stopping structure 13 or the second stopping structure 14, the contacting structure 120 of the adjustment element 12 is arranged between the protrusion stopper C1 and the resilience stopping bulge C2. Consequently, the purpose of stopping and positioning the adjustment element 12 is achieved.

In an embodiment, the first stopping structure 13 and the second stopping structure 14 are integrally formed with the front cover 101 of the casing 10. Moreover, the first stopping structure 13 and the second stopping structure 14 are arranged on different positions of an outer periphery of the second hollow portion 1010 of the front cover 101. The protrusion stopper C1 is protruded from the front cover 101 in the direction toward the adjustment element 12. Especially, the resilience stopping bulge C2 is an elastic piece that is flexibly swung, and a bulge protruded in the direction toward the adjustment element 12 is formed on the elastic piece.

The interactions and connection relationships between the contacting structure 120, the first stopping structure 13 and the second stopping structure 14 will be described in more details as follows.

When the adjustment element 12 is rotated by the user, the adjustment element 12 is rotated relative to the casing 10. As the adjustment element 12 is rotated, the camera assembly 11 is correspondingly rotated. Consequently, the camera assembly 11 can be switched between the horizontal photographing mode and the vertical photographing mode.

Please refer to FIG. 7. When the camera assembly 11 is rotated with the adjustment element 12 and the camera assembly 11 is switched to the horizontal photographing mode, the contacting structure 120 of the adjustment element 12 is correspondingly rotated and moved to the position corresponding to the first stopping structure 13 and positioned at the first stopping structure 13. That is, the contacting structure 120 of the adjustment element 12 is contacted between the protrusion stopper C1 and the resilience stopping bulge C2 of the first stopping structure 13. Moreover, as the adjustment element 12 is rotated, the marking structure 123 and the first end E1 of the anti-slip structure 124 are rotated and moved to the position corresponding to the first stopping structure 13.

Please refer to FIG. 8. When the camera assembly 11 is rotated with the adjustment element 12 and the camera assembly 11 is switched from the horizontal photographing mode to the vertical photographing mode, the contacting structure 120 of the adjustment element 12 is correspondingly rotated and moved to the position corresponding to the second stopping structure 14 and positioned at the second stopping structure 14. That is, the contacting structure 120 of the adjustment element 12 is contacted between the protrusion stopper C1 and the resilience stopping bulge C2 of the second stopping structure 14. Moreover, as the adjustment element 12 is rotated, the marking structure 123 and the first end E1 of the anti-slip structure 124 are rotated and moved to the position corresponding to the second stopping structure 14.

From the above descriptions, the present invention provides the image capturing device. As the adjustment element is rotated, the camera assembly is correspondingly rotated. Consequently, the camera assembly can be switched between the horizontal photographing mode and the vertical photographing mode. When the camera assembly is rotated with the adjustment element and the camera assembly 11 is switched to the horizontal photographing mode or the vertical photographing mode, the contacting structure of the adjustment element is positioned at the first stopping structure or the second stopping structure. In other words, regardless of whether the camera assembly is in the horizontal photographing mode or the vertical photographing mode, the camera assembly is not rocked. Consequently, the photographing quality of the camera assembly is not adversely affected.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image capturing device, comprising:
   a casing;
   a camera assembly disposed within the casing, wherein a portion of the camera assembly is exposed outside the casing;
   an adjustment element connected with the camera assembly, and rotatable relative to the casing, wherein as the adjustment element is rotated, the camera assembly is correspondingly rotated, so that the camera assembly is switchable between a horizontal photographing mode and a vertical photographing mode, wherein the adjustment element comprises a contacting structure;
   a first stopping structure arranged between the casing and the adjustment element; and
   a second stopping structure arranged between the casing and the adjustment element, wherein the first stopping structure and the second stopping structure are located at different positions,
   wherein when the camera assembly is rotated with the adjustment element and the camera assembly is switched from the vertical photographing mode to the horizontal photographing mode, the contacting structure is positioned at the first stopping structure, wherein when the camera assembly is rotated with the adjustment element and the camera assembly is switched from the horizontal photographing mode to the vertical photographing mode, the contacting structure is positioned at the second stopping structure;
   wherein the camera assembly comprises a shell member and a lens module, and the lens module is installed within the shell member, wherein the shell member has a front surface and a first hollow portion, and the first hollow portion is formed in the front surface of the shell member, wherein the lens module comprises a lens unit, a pedestal and a circuit board, wherein the pedestal is arranged between the lens unit and the circuit board, the circuit board is fixed on the shell member, and the lens unit is penetrated through the first hollow portion and exposed outside the shell member; and
   wherein the casing comprises a front cover and a rear cover, and the front cover has a second hollow portion, wherein the camera assembly is arranged between the front cover and the rear cover, and the lens unit of the lens module and the front surface of the shell member are exposed outside the second hollow portion.

2. The image capturing device according to claim 1, wherein the first stopping structure and the second stopping structure are arranged on different positions of an outer periphery of the second hollow portion.

3. The image capturing device according to claim 1, wherein the adjustment element is connected with the front surface of the shell member, so that the front cover is clamped between the adjustment element and the shell member.

4. The image capturing device according to claim 1, wherein the adjustment element comprises a base plate and a sheathing wall, and the base plate has a third hollow portion, wherein the sheathing wall is protruded from an edge region of the base plate in a direction toward the front cover, and the sheathing wall has an inner surface and an outer surface opposite to the inner surface, wherein the contacting structure of the adjustment element is formed on the inner surface of the sheathing wall, and the lens unit of the lens module is exposed outside the third hollow portion.

5. The image capturing device according to claim 4, wherein the adjustment element further comprises an anti-slip structure, and the anti-slip structure is formed on the outer surface of the sheathing wall.

6. The image capturing device according to claim 4, wherein the adjustment element further comprises a marking structure, and the marking structure is located at the base plate of the adjustment element and located near the contacting structure, wherein when the camera assembly is rotated with the adjustment element and the camera assembly is switched from the vertical photographing mode to the horizontal photographing mode, the contacting structure is positioned at the first stopping structure, and the marking structure is aligned with the first stopping structure, wherein when the camera assembly is rotated with the adjustment element and the camera assembly is switched from the horizontal photographing mode to the vertical photographing mode, the contacting structure is positioned at the second stopping structure, and the marking structure is aligned with the second stopping structure.

7. The image capturing device according to claim 1, wherein each of the first stopping structure and the second stopping structure comprises a protrusion stopper and a resilience stopping bulge, wherein when the contacting structure is positioned at the first stopping structure or the second stopping structure, the contacting structure of the adjustment element is arranged between the protrusion stopper and the resilience stopping bulge.

8. The image capturing device according to claim 1, wherein the first stopping structure is integrally formed with the casing, and the second stopping structure is integrally formed with the casing.

9. An image capturing device, comprising:
   a casing;

a camera assembly disposed within the casing, wherein a portion of the camera assembly is exposed outside the casing;

an adjustment element connected with the camera assembly, and rotatable relative to the casing, wherein as the adjustment element is rotated, the camera assembly is correspondingly rotated, so that the camera assembly is switchable between a horizontal photographing mode and a vertical photographing mode, wherein the adjustment element comprises a contacting structure;

a first stopping structure arranged between the casing and the adjustment element; and a second stopping structure arranged between the casing and the adjustment element, wherein the first stopping structure and the second stopping structure are located at different positions, wherein when the camera assembly is rotated with the adjustment element and the camera assembly is switched from the vertical photographing mode to the horizontal photographing mode, the contacting structure is positioned at the first stopping structure, wherein when the camera assembly is rotated with the adjustment element and the camera assembly is switched from the horizontal photographing mode to the vertical photographing mode, the contacting structure is positioned at the second stopping structure; and wherein each of the first stopping structure and the second stopping structure comprises a protrusion stopper and a resilience stopping bulge, wherein when the contacting structure is positioned at the first stopping structure or the second stopping structure, the contacting structure of the adjustment element is arranged between the protrusion stopper and the resilience stopping bulge.

* * * * *